United States Patent
Johnson et al.

(10) Patent No.: US 11,547,960 B2
(45) Date of Patent: Jan. 10, 2023

(54) FILTER ARRANGEMENT WITH SUPPORT CORE AND METHODS

(71) Applicant: Donaldson Company, Inc., Minneapolis, MN (US)

(72) Inventors: Philip Edward Johnson, Apple Valley, MN (US); Jonathan George Parsons, Lino Lakes, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 17/483,168

(22) Filed: Sep. 23, 2021

(65) Prior Publication Data
US 2022/0008844 A1    Jan. 13, 2022

Related U.S. Application Data

(62) Division of application No. 16/798,668, filed on Feb. 24, 2020, now Pat. No. 11,135,530, which is a division of application No. 14/728,263, filed on Jun. 2, 2015, now Pat. No. 10,569,200.

(60) Provisional application No. 62/007,193, filed on Jun. 3, 2014.

(51) Int. Cl.
*B01D 29/13* (2006.01)
*B01D 29/15* (2006.01)

(52) U.S. Cl.
CPC ............. *B01D 29/13* (2013.01); *B01D 29/15* (2013.01); *B01D 2201/0415* (2013.01)

(58) Field of Classification Search
CPC . B01D 29/13; B01D 29/15; B01D 2201/0415
See application file for complete search history.

(56) References Cited

U.S. PATENT DOCUMENTS

| | | |
|---|---|---|
| 2,864,505 A | 12/1958 | Kasten |
| 2,929,506 A | 3/1960 | Belgarde |
| 3,228,527 A | 1/1966 | McPherson |
| 3,388,802 A | 6/1968 | Wilkinson |
| 3,494,114 A | 2/1970 | Nelson et al. |
| 4,141,128 A | 2/1979 | Wonderling |
| 4,204,967 A | 5/1980 | Bannister |
| 4,482,367 A | 11/1984 | Howeth |
| 4,487,227 A | 12/1984 | Meissner |
| 4,537,681 A | 8/1985 | Argiropoulos et al. |

(Continued)

FOREIGN PATENT DOCUMENTS

| | | |
|---|---|---|
| DE | 3046179 A | 7/1982 |
| DE | 4430341 A1 | 3/1995 |

(Continued)

OTHER PUBLICATIONS

Begerow, Cartridge filtration, Beco Protect TS, Aug. 2007, 1 A 4.3.9—EB, Germany.

(Continued)

*Primary Examiner* — Waqaas Ali
(74) *Attorney, Agent, or Firm* — Merchant & Gould P.C.

(57) ABSTRACT

A filter arrangement includes first and second media packs with a support core in between. The support core includes a first ring at one end and, optionally, second ring at an opposite end. In some arrangements, at least a first member and second member extend from the first ring while being engagement-free to each other. In some arrangements, no more than a first member extends from the first ring, while being engagement-free relative to itself.

12 Claims, 15 Drawing Sheets

(56) References Cited

U.S. PATENT DOCUMENTS

| | | |
|---|---|---|
| 4,592,838 A | 6/1986 | Christophe et al. |
| 4,634,458 A | 1/1987 | Craig |
| 5,152,890 A | 10/1992 | Linnerstein |
| 5,490,930 A | 2/1996 | Krull |
| 5,928,512 A | 7/1999 | Hatch et al. |
| 6,068,762 A | 5/2000 | Stone et al. |
| 6,139,725 A | 10/2000 | Barr et al. |
| 6,478,958 B1 | 11/2002 | Beard et al. |
| 6,602,308 B1 | 8/2003 | Carle et al. |
| 6,652,614 B2 | 11/2003 | Gieseke et al. |
| 6,800,200 B2 | 10/2004 | Bassett et al. |
| 6,863,758 B1 | 3/2005 | Altmeyer et al. |
| 6,984,319 B2 | 1/2006 | Merritt et al. |
| 7,011,517 B2 | 3/2006 | Nicozisis |
| 7,597,734 B2 | 10/2009 | Johnson et al. |
| 7,837,754 B2 | 11/2010 | Johnson et al. |
| 8,057,669 B2 | 11/2011 | Beard et al. |
| 2002/0073665 A1 | 6/2002 | Gieseke et al. |
| 2003/0226793 A1 | 12/2003 | Merritt et al. |
| 2004/0118092 A1 | 6/2004 | Tran et al. |
| 2005/0056582 A1 | 3/2005 | Patel et al. |
| 2005/0258092 A1 | 11/2005 | Mertens |
| 2006/0113233 A1 | 6/2006 | Merritt et al. |
| 2006/0186031 A1 | 8/2006 | Fick et al. |
| 2006/0191832 A1 | 8/2006 | Richie et al. |
| 2006/0191836 A1 | 8/2006 | Dworatzek et al. |
| 2006/0191839 A1 | 8/2006 | Howard et al. |
| 2008/0245719 A1 | 10/2008 | Beard et al. |
| 2010/0006514 A1 | 1/2010 | Johnson |
| 2011/0006017 A1 | 1/2011 | Wieczorek |
| 2012/0261355 A1 | 10/2012 | Curt et al. |
| 2014/0083927 A1 | 3/2014 | Pflueger et al. |

FOREIGN PATENT DOCUMENTS

| | | |
|---|---|---|
| DE | 102 33 475 A1 | 2/2004 |
| EP | 0424933 A2 | 5/1991 |
| EP | 0635295 A2 | 1/1995 |
| FR | 2 034 090 A1 | 12/1970 |
| FR | 2 412 665 A1 | 7/1979 |
| FR | 2 883 487 A1 | 9/2006 |
| GB | 1280357 | 7/1972 |
| GB | 2046613 B | 3/1983 |
| WO | WO 2006/091557 A2 | 8/2006 |
| WO | WO 2006/107721 A1 | 10/2006 |

OTHER PUBLICATIONS

Begerow, Instructions for Regenerating Filter Cartridges, Beco Protect PG and Beco Protect TS, Aug. 2007, 1 A 4.3.1.1—EB, Germany.

Invitation to Pay Additional Fees with Partial International Search for Application No. PCT/US2015/033740 dated Oct. 9, 2015.

International Search Report and Written Opinion for Application No. PCT/US2015/033740 dated Dec. 23, 2015.

FILTER ARRANGEMENT WITH SUPPORT CORE AND METHODS

CROSS REFERENCE TO RELATED APPLICATION

This application is a divisional of U.S. patent application Ser. No. 16/798,668, filed Feb. 24, 2020, which is a divisional of U.S. patent application Ser. No. 14/728,263, filed Jun. 2, 2015, which issued as U.S. Pat. No. 10,569,200, which claims the benefit of U.S. Provisional Patent Application Ser. No. 62/007,193, filed Jun. 3, 2014, which are incorporated herein by reference in their entirety.

TECHNICAL FIELD

This application relates to filter arrangements. In particular, this application relates to filters for liquids in industrial processes and methods of operation.

BACKGROUND

Filters are provided for the filtration of liquids in various industrial processes. In typical use, the filters are sterilized by the use of superheated steam pumped backward through the normal flow direction of the filter cartridge. Many typical prior art filters for industrial processes have filter components that are made from non-metallic material, such as polypropylene. When the superheated steam hits the polypropylene part of the filter, it can collapse because of the yield point of polypropylene.

Improvements in the prior art are desirable.

SUMMARY

A filter arrangement is provided comprising: a first tubular media pack defining a first interior volume; the first tubular media pack having opposite first and second ends; a second tubular media pack operably positioned in the first interior volume; the second tubular media pack having a second interior volume; a support core operably positioned in the first interior volume in touching engagement with and between the first tubular media pack and second tubular media pack; the support core including, at least a first ring; at least a first member and a second member extending from the first ring; the first member being at a non-orthogonal angle relative to the first ring; the second member being at a non-orthogonal angle relative to the first ring; and the first member and second member being engagement-free to each other along an extension adjacent to a complete length of the second tubular media pack.

A filter arrangement is provided comprising: a first tubular media pack defining a first interior volume; the first tubular media pack having opposite first and second ends; a second tubular media pack operably positioned in the first interior volume; the second tubular media pack having a second interior volume; a support core operably positioned in the first interior volume in touching engagement with and between the first tubular media pack and second tubular media pack; the support core including, at least a first ring; at least a first member and a second member extending from the first ring; the first member being at a non-orthogonal angle relative to the first ring; the second member being at a non-orthogonal angle relative to the first ring; and the first member and second member being engagement-free to each other along an extension of at least 75% of a complete length of the first tubular media pack.

A filter arrangement is provided comprising: a first tubular media pack defining a first interior volume; the first tubular media pack having opposite first and second ends; a second tubular media pack operably positioned in the first interior volume; the second tubular media pack having a second interior volume; a support core operably positioned in the first interior volume in touching engagement with and between the first tubular media pack and second tubular media pack; the support core including, at least a first ring; at least a first member and a second member extending from the first ring; the first member being at a non-orthogonal angle relative to the first ring; the second member being at a non-orthogonal angle relative to the first ring; and the first member and second member being engagement-free to each other along an extension of at least 8 inches from the second end of the first tubular media pack.

A filter arrangement is provided comprising: a first tubular media pack defining a first interior volume; the first tubular media pack having opposite first and second ends; a second tubular media pack operably positioned in the first interior volume; the second tubular media pack having a second interior volume; a support core operably positioned in the first interior volume in touching engagement with and between the first tubular media pack and second tubular media pack; the support core including, at least a first ring; at least a first member and a second member extending from the first ring; a first plurality of bars extending from the first member at a non-zero angle thereto; a second plurality of bars extending from the second member at a non-zero angle thereto; and the first member and second member being engagement-free to each other along an extension adjacent to a complete length of the second tubular media pack.

A filter arrangement is provided comprising: a first tubular media pack defining a first interior volume; the first tubular media pack having opposite first and second ends; a second tubular media pack operably positioned in the first interior volume; the second tubular media pack having a second interior volume; a support core operably positioned in the first interior volume in touching engagement with and between the first tubular media pack and second tubular media pack; the support core including, at least a first ring; at least a first member and a second member extending from the first ring; a first plurality of bars extending from the first member at a non-zero angle thereto; a second plurality of bars extending from the second member at a non-zero angle thereto; and the first member and second member being engagement-free to each other along an extension of at least 75% of a complete length of the first tubular media pack.

A filter arrangement is provided comprising: a first tubular media pack defining a first interior volume; the first tubular media pack having opposite first and second ends; a second tubular media pack operably positioned in the first interior volume; the second tubular media pack having a second interior volume; a support core operably positioned in the first interior volume in touching engagement with and between the first tubular media pack and second tubular media pack; the support core including, at least a first ring; at least a first member and a second member extending from the first ring; a first plurality of bars extending from the first member at a non-zero angle thereto; a second plurality of bars extending from the second member at a non-zero angle thereto; and the first member and second member being engagement-free to each other along an extension of at least 8 inches from the second end of the first tubular media pack.

A filter arrangement is provided comprising: a first tubular media pack defining a first interior volume; the first tubular media pack having opposite first and second ends; a second tubular media pack operably positioned in the first interior volume; the second tubular media pack having a second interior volume; a support core operably positioned in the first interior volume in touching engagement with and between the first tubular media pack and second tubular media pack; the support core including, at least a first ring; no more than a first member being at a non-orthogonal angle relative to the first ring; the first member being engagement-free between itself along an extension adjacent to a complete length of the second tubular media pack.

A filter arrangement is provided comprising: a first tubular media pack defining a first interior volume; the first tubular media pack having opposite first and second ends; a second tubular media pack operably positioned in the first interior volume; the second tubular media pack having a second interior volume; a support core operably positioned in the first interior volume in touching engagement with and between the first tubular media pack and second tubular media pack; the support core including, at least a first ring; no more than a first member being at a non-orthogonal angle relative to the first ring; the first member being engagement-free between itself along an extension of at least 75% of a complete length of the first tubular media pack.

A filter arrangement is provided comprising: a first tubular media pack defining a first interior volume; the first tubular media pack having opposite first and second ends; a second tubular media pack operably positioned in the first interior volume; the second tubular media pack having a second interior volume; a support core operably positioned in the first interior volume in touching engagement with and between the first tubular media pack and second tubular media pack; the support core including, at least a first ring; no more than a first member being at a non-orthogonal angle relative to the first ring; the first member being engagement-free between itself along an extension of at least 8 inches from the second end of the first tubular media pack.

The second tubular media pack may have a shorter length than the first tubular media pack.

The second tubular media pack can be at least 50% of the length of the first tubular media pack.

The second tubular media pack can be not greater than 95% of the length of the first tubular media pack.

The first member and second member may be engagement-free to each other along an extension adjacent to a complete length of the first tubular media pack.

The first member can be engagement-free between itself along an extension adjacent to a complete length of the first tubular media pack.

The at least first member and second member include at least four members arranged in a spiral.

The at least first member and second member include at least four members arranged in a spline.

The at least first member and second member include at least four members arranged in a zig-zag shape.

The first plurality of bars may extend from the first member at about a 90° angle thereto; and the second plurality of bars may extend from the second member at about a 90° angle thereto.

The first member can be arranged in a spiral.

A first end cap can be adjacent to the first end of the first tubular media pack; and a second end cap can be adjacent to the second end of the first tubular media pack.

The first end cap may have a first opening in communication with the first interior volume; and the second cap may have a second opening in communication with the second interior volume.

The second tubular media pack has a first end and an opposite second end; and further comprising a third end cap secured to the first end of the second tubular media pack; the third end cap being a closed end cap.

The second end of the second tubular media pack and the second end of the first tubular media pack may be secured to the second end cap.

The first end of the first tubular media pack can be secured to the first end cap; and the third end cap can be axially spaced from the first end cap and located in the first interior volume.

The first end cap first opening can be not in communication with the second interior volume; and the second end cap second opening can be not in communication with the first interior volume.

The support core, first end cap, second end cap, and third end cap may be made from the same material.

The support core, first end cap, second end cap, and third end cap may be made from polypropylene.

The first tubular media pack comprises pleated media; and the second tubular media pack comprises pleated media.

The support core has a third interior volume; and the second tubular media pack can be located within the third interior volume.

The first ring can be adjacent to the first end of the first tubular media pack.

A second ring can be adjacent to the second end of the first tubular media pack.

The first member and second member can connect the first ring and second ring; the first member being at a non-orthogonal angle relative to the second ring; and the second member being at a non-orthogonal angle relative to the second ring.

A second ring can adjacent to the second end of the first tubular media pack; and the first member being at a non-orthogonal angle relative to the second ring.

A method of filtering liquid using any one of the filter arrangements as characterized above is provided. The method includes: directing unfiltered liquid from outside of the filter arrangement to a filtered liquid volume in the filter arrangement through at least a first path and second path; the first path including unfiltered liquid flowing from outside of the first tubular media pack, through the first tubular media pack, and into the filtered liquid volume; the second path including unfiltered liquid flowing from outside the filter arrangement, into the second interior volume, through the second tubular media pack, and into the filtered liquid volume; and directing the liquid from the filtered liquid volume to exit the filter arrangement.

DETAILED DESCRIPTION

Figure 1:
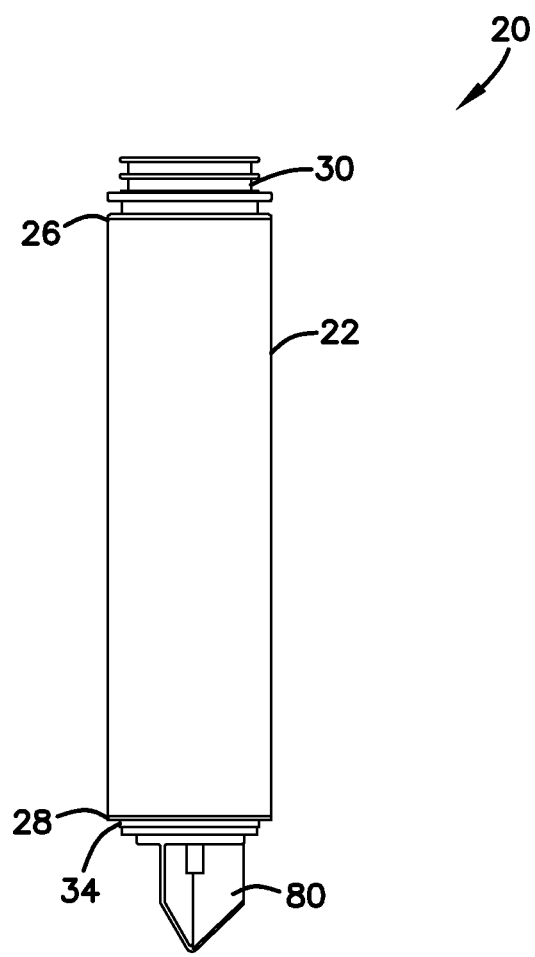
FIG. 1 is a side view of an embodiment of a filter arrangement made in accordance with the principles of this disclosure.

FIG. 1 illustrates an embodiment of a filter arrangement 20 constructed in accordance with principles of this disclosure. The filter arrangement 20 can be used in a variety of applications. Typically, the filter arrangement 20 will be used to filter liquids during an industrial process.

Figure 2:
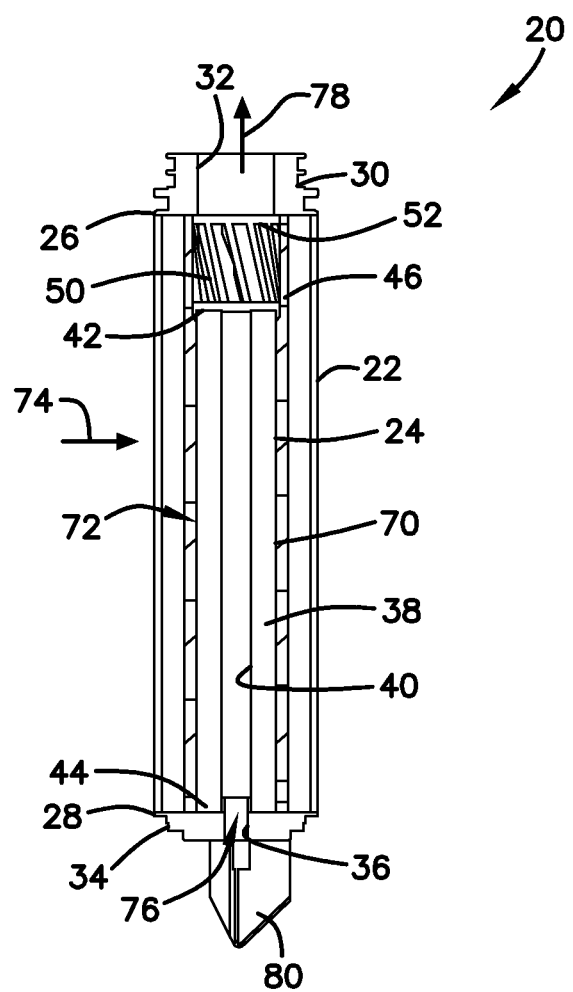
FIG. 2 is a cross-sectional view of the filter arrangement of FIG. 1.
Figure 3:
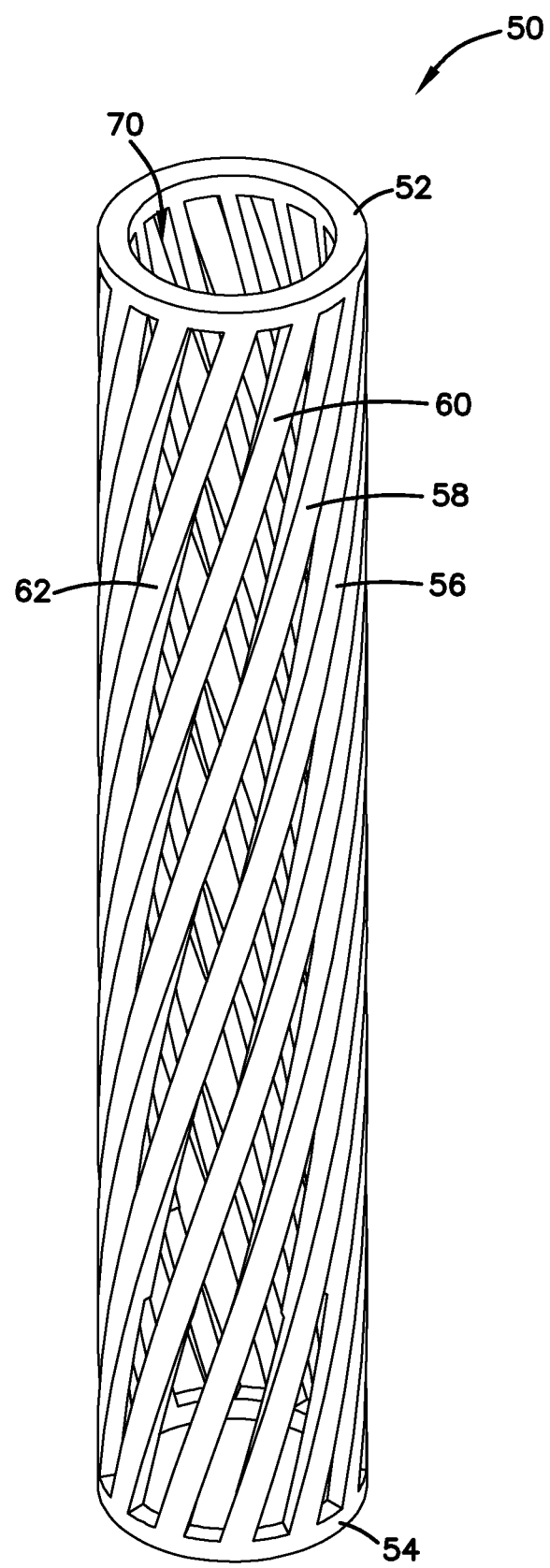
FIG. 3 is a perspective view of an embodiment of a support core used in the filter arrangement of FIGS. 1 and 2.
Figure 4:
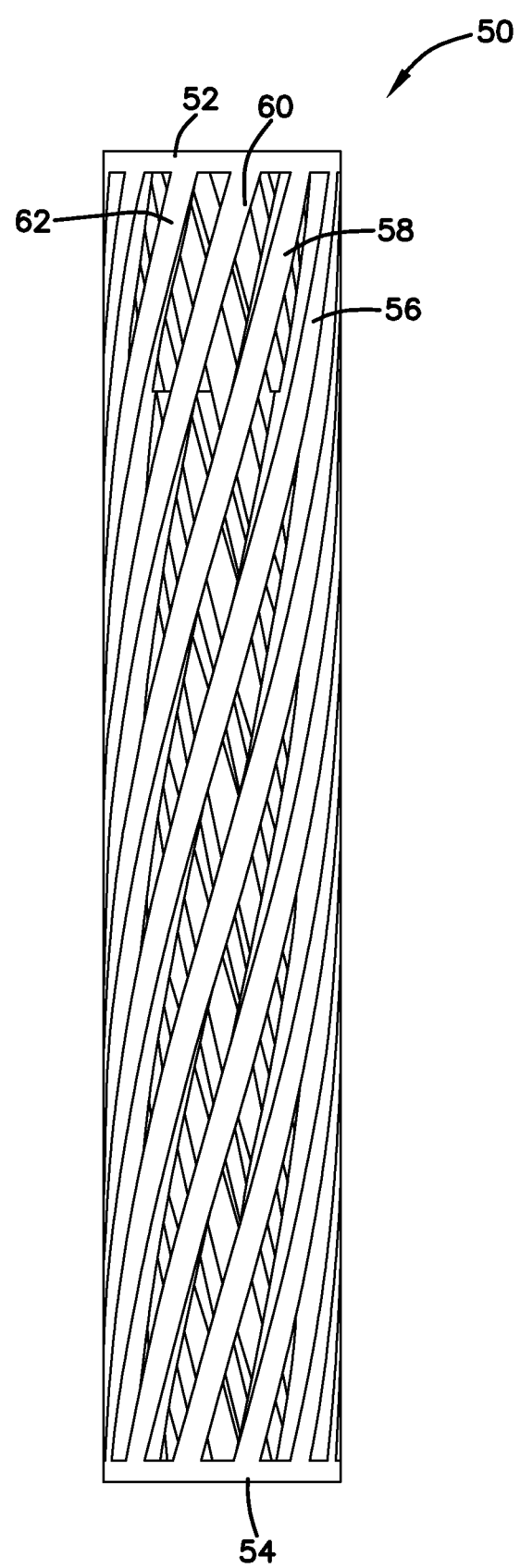
FIG. 4 is a side elevational view of the support core of FIG. 3.

In reference to FIGS. 1 and 2, the filter arrangement 20 includes a first tubular media pack 22. By the term "tubular" it is meant that the media pack is in the shape of a tube defining a first interior volume 24. The tube shape need not be cylindrical, but in preferred embodiments, it is cylindrical, such that the cross-section of the first tubular media pack 22 is circular. In other embodiments, the tubular media pack 22 could be oval, elliptical, or other shapes, for example.

The first tubular media pack 22 can be many types of filter media. In many preferred embodiments, the first tubular media pack 22 comprises pleated media, for example, pleated cellulose media. The first tubular media pack 22 has first and second opposite ends 26, 28.

The filter arrangement 20 includes a first end cap 30. The first end cap 30 is depicted as being adjacent to the first end 26 of the first tubular media pack 22. In preferred implementations, the first end cap 30 will be secured to the first end 26 of the first tubular media pack 22.

The first end cap 30 has a first opening 32 in communication with the first interior volume 24.

The filter arrangement 20 includes a second end cap 34. The second end cap 34 is adjacent to the second end 28 of the first tubular media pack 22. In preferred embodiments, the second end cap 34 is secured to the second end 28 of the first tubular media pack 22.

The second end cap 34 has an opening, referred to herein as second opening 36. The second opening 36 is not in communication with the first interior volume 24. The second opening 36 is in communication with another interior volume, as discussed below.

The filter arrangement 20 includes a second tubular media pack 38. The second tubular media pack 38 will typically have the same cross-sectional shape as the first tubular media pack 22. For example, the second tubular media pack 38 can be cylindrical, having a circular cross-section, or it can be oval, elliptical, or other shapes that form a tube. Many different types of media can be used. In preferred embodiments, the media will be pleated media, for example, pleated cellulose media.

The second tubular media pack 38 defines a second interior volume 40. As can be seen in FIG. 2, the second tubular media pack 38 is operably positioned in the first interior volume 24.

The second tubular media pack 38 has a first end 42 and an opposite second end 44. In preferred embodiments, the second end 44 is secured to the second end cap 34. The second opening 36 is in communication with the second interior volume 40.

The filter arrangement 20 can further include a third end cap 46. The third end cap 46 is secured to the first end 42 of the second tubular media pack 38. Preferably, the third end cap 46 is a closed end cap.

As can be seen in the arrangement of FIG. 2, the first opening 32 in the first end cap 30 is not in communication with the second interior volume 40 of the second tubular media pack 38.

Preferably, the second tubular media pack 38 has a shorter length than the first tubular media pack 22. In many preferred embodiments, the second tubular media pack 38 will be at least 50% of the length of the first tubular media pack 22. Although many different embodiments are possible, in some arrangements, the second tubular media pack 38 is not greater than 95% of the length of the first tubular media pack 22.

In accordance with principles of this disclosure, the filter arrangement 20 includes a support core 50. The support core 50 is operably positioned in the first interior volume 24 in touching engagement with and between the first tubular media pack 22 and the second tubular media pack 38. The support core 50 extends radially between and against the first tubular media pack 22 and second tubular media pack 38. In this manner, the core 50 forms a solid bridge between and against the first tubular media pack 22 and second tubular media pack 38. This results in providing a structural support against forces during use or sterilization of the filter arrangement 20.

The support core 50 generally includes a first ring 52. The first ring 52 can be located adjacent to the first end 26 of the first tubular media pack 22. In FIG. 2, the first ring 52 is also adjacent to the first end cap 30.

The support core 50 may also include an optional second ring 54. The second ring 54 can be adjacent to the second end 28 of the first tubular media pack 22. The second ring is preferred, but optional, because instead of having second ring 54, the members of the support core (described further below) can be directly secured to the second end cap 34 instead of a second ring. In the example cores 50 shown in FIGS. 3-15, each core 50 is depicted with second ring 54, but it should be understood to be optional.

When used, the second ring 54 is adjacent to the second end cap 34. The first ring 52 and second ring 54 have a cross-sectional shape that is generally the same cross-sectional shape as the first tubular media pack 22 and second tubular media pack 38. In the example shown, the first ring 52 and second ring 54 have a generally circular cross-section. Other embodiments are possible.

In the embodiments of FIGS. 3-8 and 10-15, the support core 50 includes at least a first member 56 extending from the first ring 52.

In embodiments including second ring 54, the first member 56 extends between and is attached or is integral with the first ring 52 and second ring 54.

The support core 50, in the embodiment of FIGS. 3-8 and 10-15 further includes a second member 58. The second member 58 extends from the first ring 52.

In embodiments that include second ring 54, the second member 58 connects the first ring 52 and second ring 54 to each other. The second member 58 can extend between and be attached or integral with the first ring 52 and second ring 54.

In the embodiment of FIGS. 3-8 and 10-13, the first member 56 is at a non-orthogonal angle relative to the first ring 52. When the second ring 54 is present, the first member 56 is at a non-orthogonal angle relative to the second ring 54.

Similarly, the second member 58 is at a non-orthogonal angle relative to the first ring 52. When the second ring 54 is present, the second member 58 is at a non-orthogonal angle relative to the second ring 54. By the term "non-orthogonal angle" it is meant an angle that is not at 90 degrees and thus can be acute (less than 90 degrees) or obtuse (greater than 90 degrees), when measured at the intersection of the member 56, 58 relative to the first ring 52 and second ring 54.

In the embodiment of FIGS. 3-8 and 10-15, the first member 56 and second member 58 are engagement-free to each other along at least a partial extension of the support core 50. By the term "engagement-free" it is meant that the first member 56 and second member 58 do not touch each other, connect with each other, or intersect with each other. Generally, the first member 56 is engagement-free with itself along the at least partial extension, and the second member 58 is engagement-free with itself along the at least partial extension.

As mentioned above, the first member 56 and second member 58 are engagement-free along at least a partial extension. This partial extension, in one embodiment, can be adjacent to a complete length of the second tubular media pack 38. In this example, the region of the support core 50 between the third end cap 46 and the first end cap 30 could include engagement, connection, or overlap between the first member 56 and second member 58.

In another variation, the first member 56 and second member 58 are engagement-free to each other along an extension of at least 75% of a complete length of the first tubular media pack 22. Along the remaining portion, there could be engagement, connection, or overlap between the first member 56 and second member 58.

In another variation, the first member 56 and second member 58 are engagement-free to each other along an extension of at least 8 inches from the second end 28 of the first tubular media pack 22. Along the remaining portion, there could be engagement, connection, or overlap between the first member 56 and second member 58.

In many preferred arrangements, the first member 56 and second member 58 are engagement-free to each other along an extension adjacent to a complete length of the first tubular media pack 22.

Attention is directed to FIGS. 3-8 and 10-15. The first member 56 and second member 58 can be arranged relative to the first ring 52 and second ring 54 (when present) in many variations.

In the embodiments of FIGS. 3-8 and 10-15, in addition to the first member 56 and second member 58 are a third member 60 and fourth member 62 such that there are at least four members.

Figure 5:
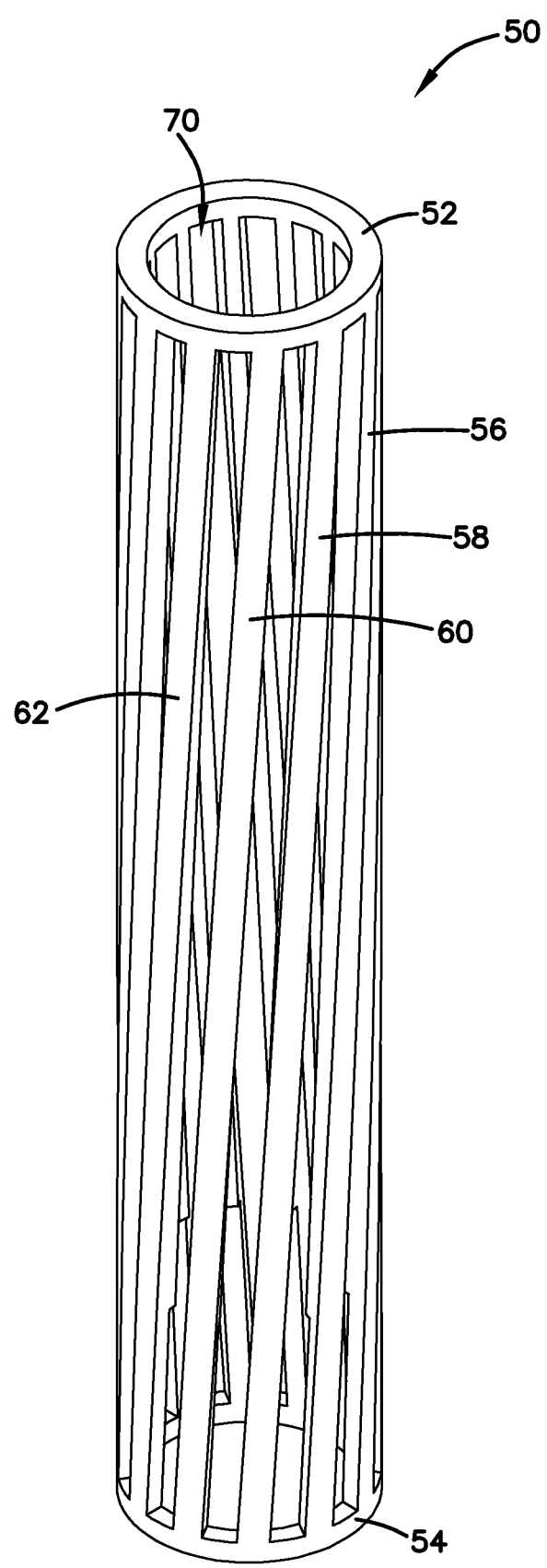
FIG. 5 is a perspective view of an embodiment of a support core usable in the filter arrangement of FIGS. 1 and 2.
Figure 6:
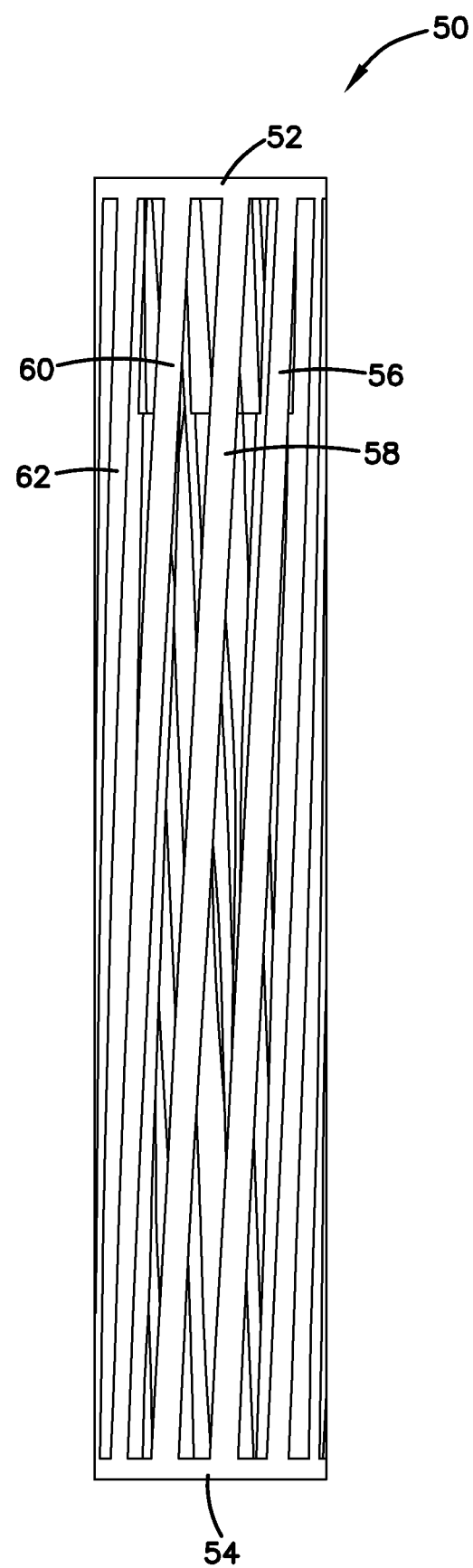
FIG. 6 is side elevational view of the support core of FIG. 5.
Figure 7:
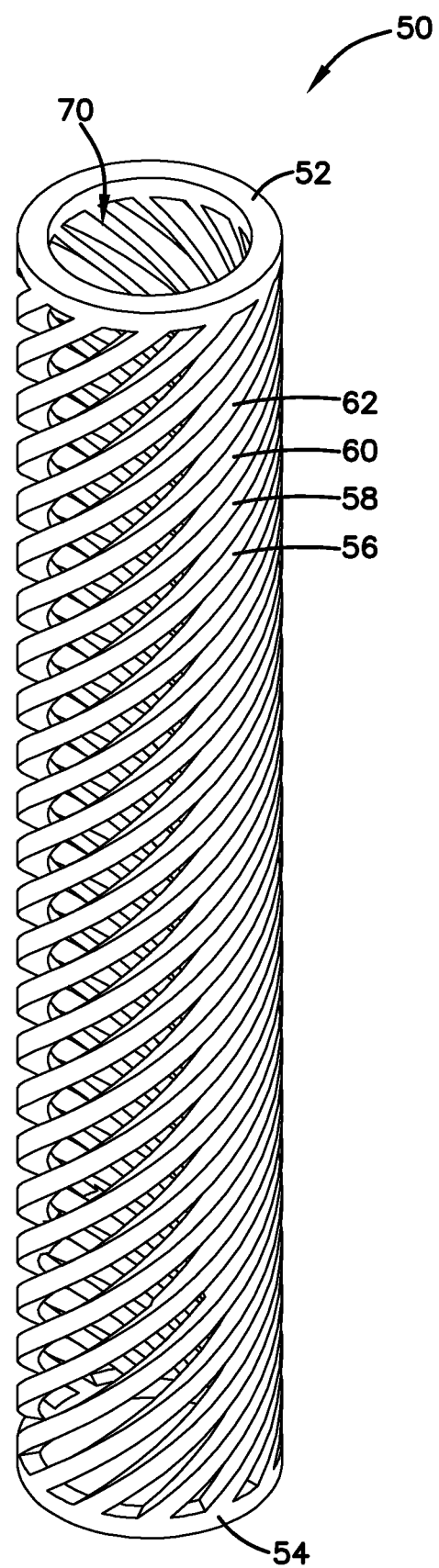
FIG. 7 is a perspective view of an embodiment of a support core usable with the filter arrangement of FIGS. 1 and 2.
Figure 8:
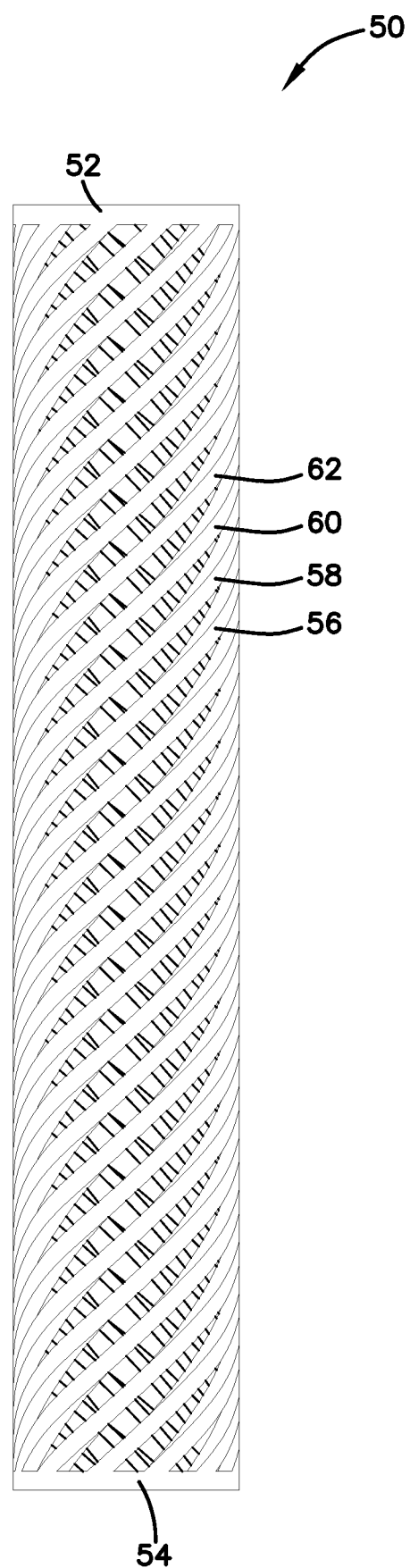
FIG. 8 is a side elevational view of the support core of FIG. 7.

In the example embodiment of FIGS. 3-8, the at least four members 56, 58, 60, 62 of the support core 50 are arranged in a spiral configuration, with varying revolutions. Many embodiments are possible, ranging from, for example 0.1 revolutions to 2.0 revolutions or more. For example, in FIGS. 3 and 4, the spiral configuration includes a repeated helix with 0.5 revolutions. In FIGS. 5 and 6, the spiral configuration includes a repeated helix with 0.1 revolutions, which approximates diagonal lines. In FIGS. 7 and 8, the spiral configuration includes a repeated helix with 2.0 revolutions.

In the spiral embodiments of FIGS. 3-8, each of the first member 56, second member 58, third member 60, and fourth member 62 are engagement-free relative to each other along at least a partial extension of the first tubular media pack 22. In some arrangements, the engagement-free zone between the members 56, 58, 60, 62 is adjacent to a complete length of the second tubular media pack 38. In other arrangements, the engagement-free zone is along an extension of at least 75% of a complete length of the first tubular media pack 22. In other arrangements, the engagement-free zone is along an extension of at least 8 inches from the second end 28 of the first tubular media pack 22.

Figure 10:
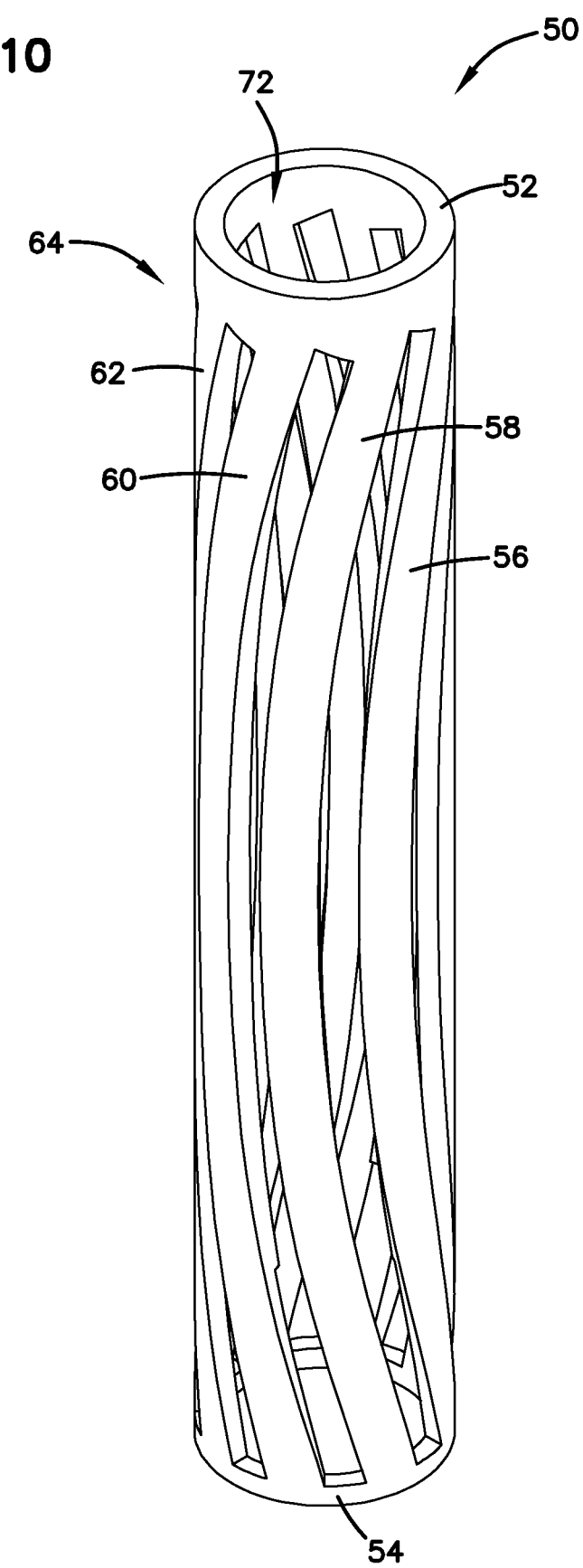
FIG. 10 is a perspective view of a support core usable with the filter arrangement of FIGS. 1 and 2.
Figure 11:
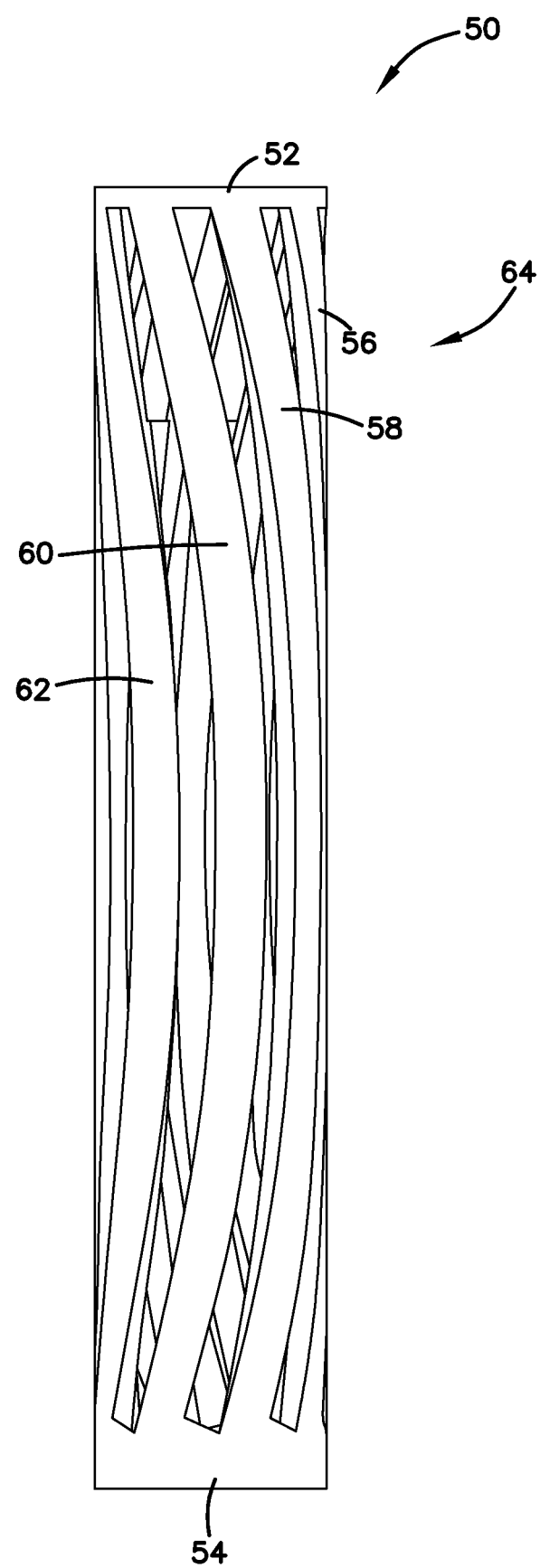
FIG. 11 is a side elevational view of the support core of FIG. 10.

In FIGS. 10 and 11, the members 56, 58, 60, 62 are shaped as continuous, smooth curves. As shown in FIGS. 10 and 11, the members 56, 58, 60, 62 are arranged in a spline 64. By the term "spline", it is meant that each member is formed as a continuous, smooth curve. The members 56, 58, 60, 62 are engagement-free along an extension. In one example, the extension is a complete length of the second tubular media pack 38. In another example, the extension is at least 75% of a complete length of the first tubular media pack 22. In another example, the extension is at least 8 inches from the second end 28 of the first tubular media pack 22.

Figure 12:
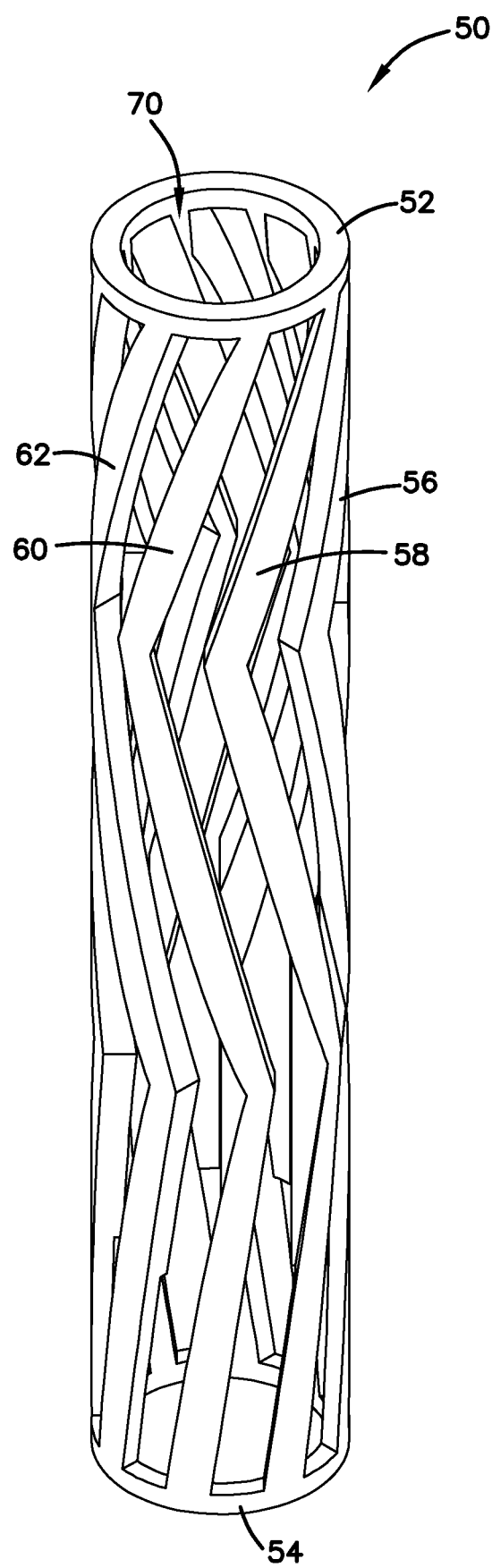
FIG. 12 is a perspective view of an embodiment of a support core usable with a filter arrangement of FIGS. 1 and 2.
Figure 13:
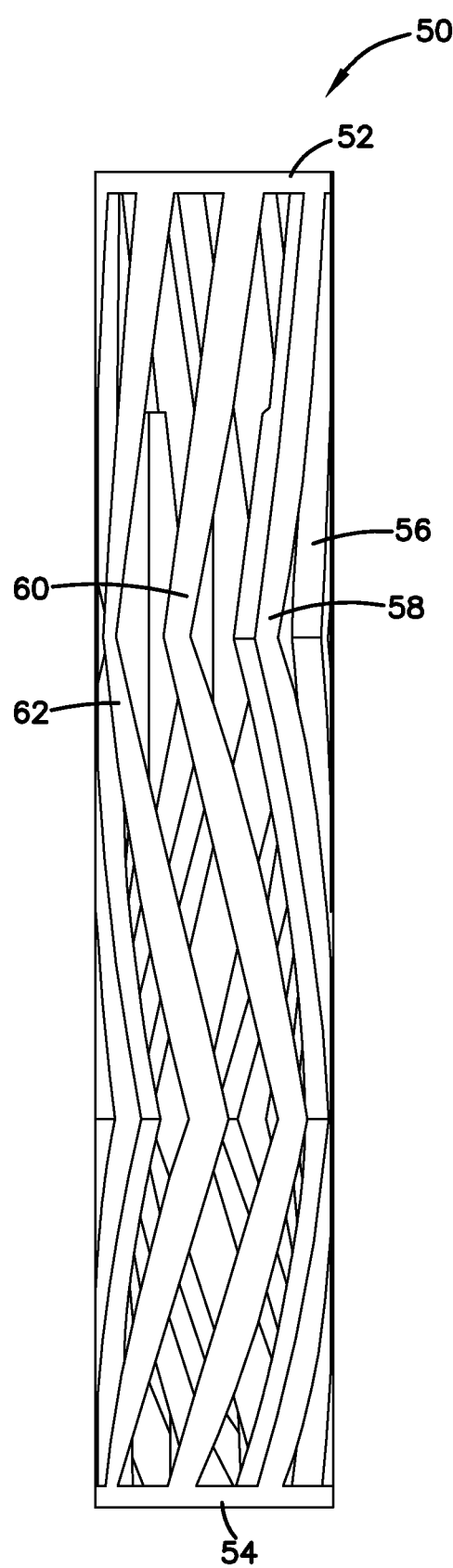
FIG. 13 is a side elevational view of the support core of FIG. 12.

In FIGS. 12 and 13, the at least four members 56, 58, 60, 62 are arranged in a zig-zag shape. That is, each of the members 56, 58, 60, 62 has a pattern of straight segments that are angled relative to each other at non-zero angles, as the members 56, 68, 60, 62 extend between the first ring 52 and second ring 54. The members 56, 58, 60, 62 are engagement-free along at least a partial extension. This partial extension can be, for example: adjacent to a complete length of the second tubular media pack 38; and/or along an extension of at least 75% of a complete length of the first tubular media pack 22; and/or along an extension of at least 8 inches from the second end 28 of the first tubular media pack 22.

Figure 14:
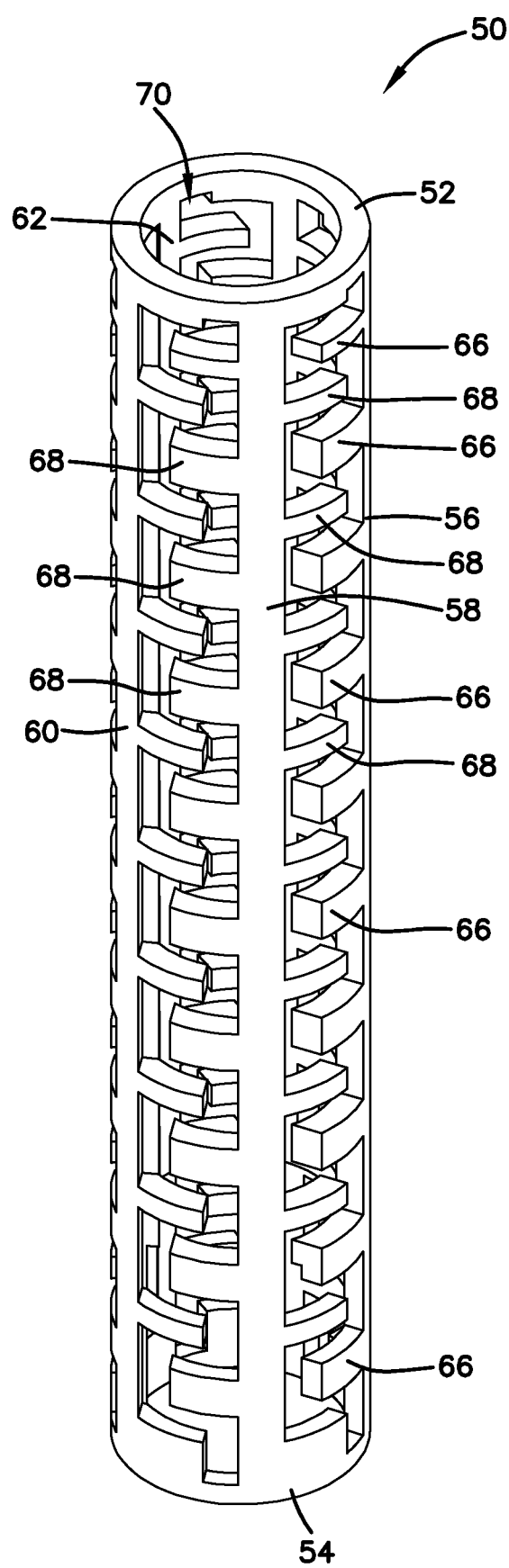
FIG. 14 is a perspective view of an embodiment of a support core usable with the filter arrangement of FIGS. 1 and 2.
Figure 15:
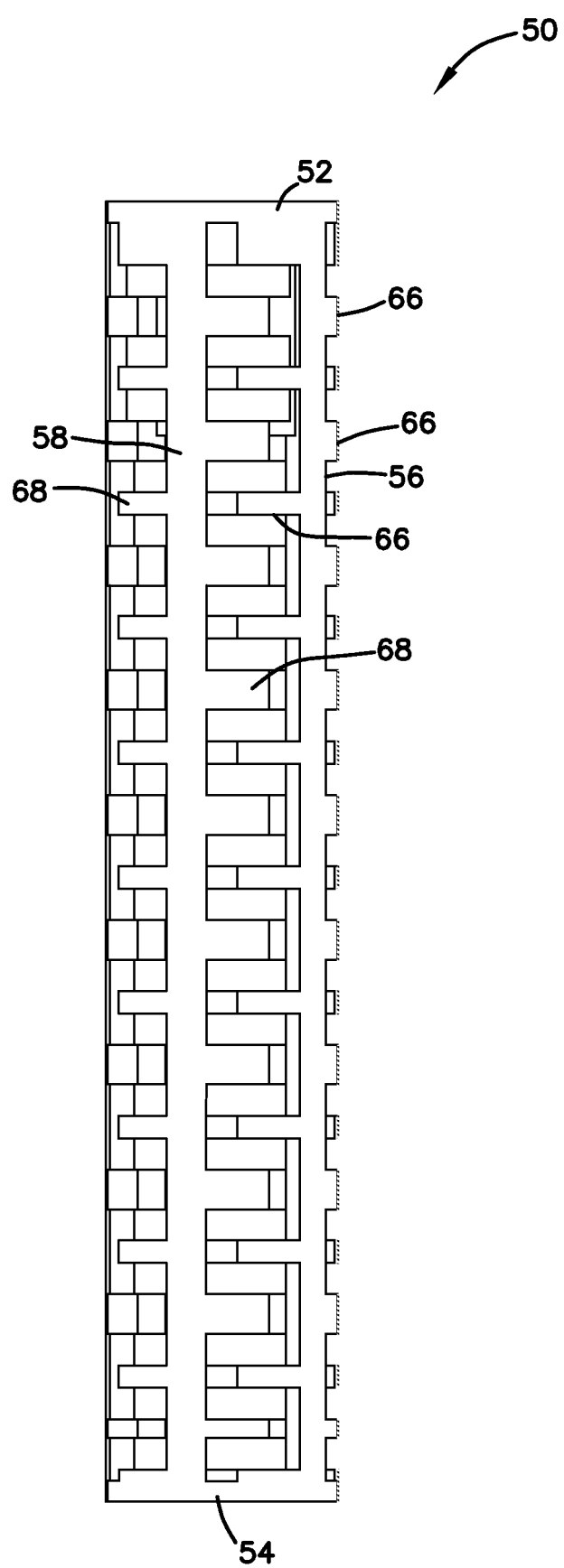
FIG. 15 is a side elevational view of the support core of FIG. 14.

Attention is directed to the embodiment of FIGS. 14 and 15. In the embodiment of FIGS. 14 and 15, the support core 50 includes the first member 56 and second member 58 extending from the first ring 52. In this embodiment, the intersection between the first member 56 and second member 58 with the first ring 52 can be orthogonal. Extending from the first member 56 is a first plurality of bars 66. The first plurality of bars 66 extend from the first member 56 at a non-zero angle thereto. In the example shown, the angle between the first plurality of bars 66 and a remaining portion of the first member 56 is about 90 degrees, but other variations are possible. The bars 66 can extend in opposite directions from the first member 56, along the length of the first member.

A second plurality of bars 68 extends from the second member 58 at a non-zero angle thereto. In the example shown, the angle is about 90 degrees, but other variations are possible. The bars 68 can extend in opposite directions from the second member 58, along the length of the second member 58.

In the example of FIGS. 14 and 15, in addition to the first member 56 and second member 58 is the third member 60 and fourth member 62. Each of the members in the support core 50 in the embodiment of FIGS. 14 and 15 includes the plurality of bars extending at a non-zero angle relative to the respective member 56, 58, 60, 62. The members 56, 58, 60, 62 are engagement-free to each other along an extension. The extension can be, for example: adjacent to a complete length of the second tubular media pack 38; and/or along an extension of at least 75% of a complete length of the first tubular media pack 22; and/or along an extension of at least 8 inches from the second end 28 of the first tubular media pack 22.

In embodiments of FIGS. 14 and 15 which include the second ring 54, the first member 56, second member 58, third member 60, and fourth member 62 can extend between the first ring 52 and second ring 54 and be orthogonal (about 90°) relative to the first ring 52 and second ring 54.

Figure 9:
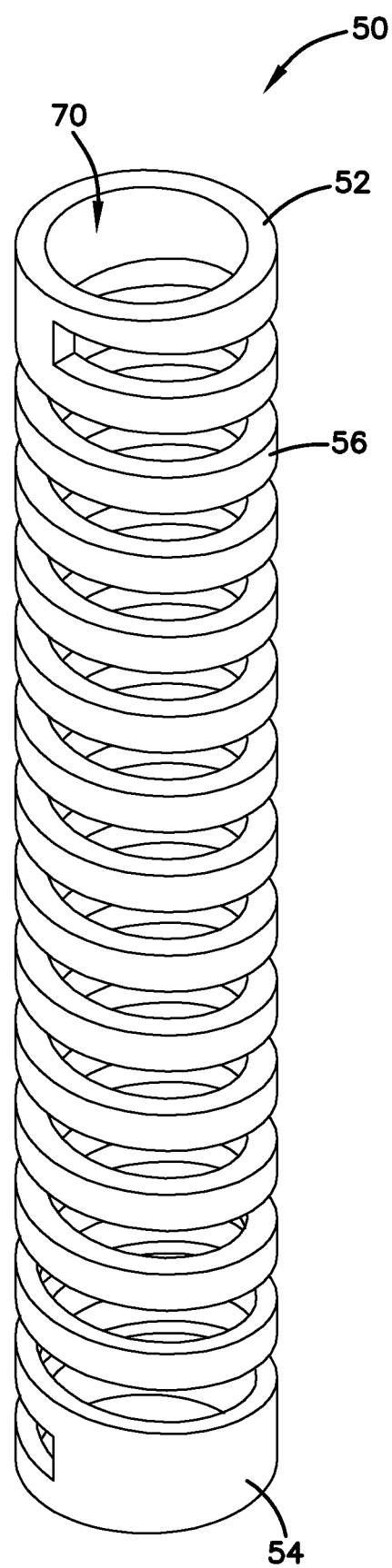
FIG. 9 is a perspective view of an embodiment of a support core usable with the filter arrangement of FIGS. 1 and 2.

Attention is directed to the support core 50 shown in FIG. 9. In this embodiment, there is no more than first member 56. The first member 56 extends from the first ring 52. In this embodiment, the first member 56 is at a non-orthogonal angle relative to the first ring 52. In embodiments that include second ring 54, the no more than the first member 56 will extend between and connect the first ring 52 and second ring 54, and the first member 56 will be at a non-orthogonal angle relative to the first ring 52 and second ring 54.

In FIG. 9, the first member 56 is engagement-free between itself along an extension. The extension can be adjacent the complete length of the second tubular media pack 38. In addition, or alternatively, the extension can be at least 75% of a complete length of the first tubular media pack 22. In addition, or alternatively, the extension can be at least 8 inches from the second end 28 of the first tubular media pack 22.

In some embodiments of FIG. 9, the first member 56 is engagement-free between itself along an extension adjacent to a complete length of the first tubular media pack 22.

As can be appreciated by reviewing FIG. 9, the first member 56, in this embodiment, is arranged in a single spiral. There can be many different revolutions used, and in the example depicted, there are 14 revolutions.

In each of these embodiments, it should be appreciated that the support core 50 defines a third interior volume 70. The second tubular media pack 38 is located within the third interior volume 70.

In preferred embodiments, the entire filter arrangement 20 is metal-free. In many arrangements, the support core 50, first end cap 30, second end cap 34, and third end cap 46 are made from the same material. In example embodiments, the support core 50, first end cap 30, second end cap 34, and third end cap 46 are made from polypropylene. In other arrangements, the support core 50 can be made from a closed cell foam, for example.

Attention is again directed to FIG. 2. In use, liquid to be filtered flows into the filter arrangement 20 and exits the filter arrangement 20 in a filtered form through the first opening 32 in the first end cap 30. The unfiltered liquid can enter the filter arrangement 20 through either the outside of the first tubular media pack 22 (shown at arrow 74), or through the second opening 36 in the second end cap 34 (shown at arrow 76) and then flow from the second interior volume 40 through the second tubular media pack 38. For the liquid flowing at arrow 74 through the first tubular media pack 22, the liquid flows from outside the first tubular media pack 22 inside to the first interior volume 24. There, the filtered liquid will flow into the space or gap between the first tubular media pack 22 and second tubular media pack 38 that is otherwise occupied by the support core 50. This region between the first tubular media pack 22 and second tubular media pack 38 corresponds to a filtered liquid volume 72. From there, the filtered liquid exits the filter arrangement 20 through the first opening 32 in the first end cap 30 (shown at arrow 78).

For the liquid entering the filter arrangement through the second opening 36 in the second end cap 34 (arrow 76), the liquid flows into the second interior volume 40 and then flows from inside to outside through the second tubular media pack 38, which filters the liquid. From there, the filtered liquid is in the filtered liquid volume 72. From the filtered liquid volume 72, the filtered liquid exits the filter arrangement through the first opening 32 in the first end cap 30 at arrow 78.

The first tubular media pack 22 and second tubular media pack 38 are free of liners or supports, other than the support core 50. The support core 50 provides support for the first tubular media pack 22 and second tubular media pack 38, which prevents collapsing during filtration or during sterilization when, for example, superheated steam may be used. The engagement-free relationship between members 56, 58, 60, 62 result in a less restrictive filter arrangement 20, as compared to prior art arrangements. The engagement-free relationship between the members 56, 58, 60, 62 allows for greater flow than in arrangements that would have connections or engagements between the members.

In the embodiment of FIGS. 3-13, the arrangement of the members 56, 58, 60, 62 relative to the longitudinal direction of pleats, when pleated media is used before the media packs 22, 38, result in an arrangement that will block or prevent pleats from penetrating the support core 50. In the embodiment of FIGS. 14 and 15, the bars 66, 68 extending from the members 56, 58, 60, 62 result to block or prevent longitudinal pleats from penetrating or pushing through the support core 50.

Typical embodiments of filter arrangement 20 can include embodiments in which the filter arrangement 20 has an outer diameter of about 2.5 inches and a length at least 10 inches, and in some cases, at least 40 inches.

In many typical arrangements, the first end cap 30 and second end cap 34 will have structure to allow the filter arrangement to interact with other equipment in the industrial process. For example, the first end cap 30 can include a bayonet connection, and the second end cap 34 can include a projection 80 that can be used as a guide.

The filter arrangement 20 as characterized above can be used to filter liquid. The method includes directing unfiltered liquid from outside of the filter arrangement 20 to the filtered liquid volume 72 through at least a first path and second path. The first path includes the unfiltered liquid flowing from outside of the first tubular media pack 22, through the first tubular media pack 22, and into the filtered liquid volume 72. The second path includes the unfiltered liquid flowing from outside of the filter arrangement 20, into the second interior volume 40, through the second tubular media pack 38 and into the filtered liquid volume 72. Next, there is a step of directing the liquid from the filtered liquid volume 72 to exit the filter arrangement 20.

The above represents principles of this disclosure. Many embodiments can be made using these principles.

What is claimed is:
1. A method of filtering liquid; the method including:
  (a) directing unfiltered liquid from outside of a filter arrangement to a filtered liquid volume in the filter arrangement through at least a first path and second path;
    (i) the first path including unfiltered liquid flowing from outside of a first tubular media pack, through the first tubular media pack, and into a first interior volume comprising the filtered liquid volume;
(ii) the second path including unfiltered liquid flowing from outside the filter arrangement, into a second interior volume, through a second tubular media pack, and into the filtered liquid volume;
(iii) a support core operably positioned in the first interior volume in touching engagement with and between the first tubular media pack and second tubular media pack; the support core including at least a first ring; at least a first member and a second member extending from the first ring;
  (A) the first member being at a non-orthogonal angle relative to the first ring;
  (B) the second member being at a non-orthogonal angle relative to the first ring; and
  (C) the first member and second member being engagement-free to each other along an extension adjacent to a complete length of the second tubular media pack; and
(b) directing the liquid from the filtered liquid volume to exit the filter arrangement.

2. The method of claim 1 wherein the step of directing unfiltered liquid from outside of a filter arrangement includes the support core having a second ring adjacent to the second end of the first tubular media pack.

3. The method of claim 2 wherein the step of directing unfiltered liquid from outside of a filter arrangement includes the first member and second member connecting the first ring and second ring; the first member being at a non-orthogonal angle relative to the second ring; and the second member being at a non-orthogonal angle relative to the second ring.

4. The method of claim 1 wherein the step of directing unfiltered liquid from outside of a filter arrangement includes the second tubular media pack having a shorter length than the first tubular media pack.

5. The method of claim 1 wherein the step of directing unfiltered liquid from outside of a filter arrangement includes the first member and second member being engagement-free to each other along an extension adjacent to a complete length of the first tubular media pack.

6. The method of claim 1 wherein the step of directing unfiltered liquid from outside of a filter arrangement includes the first member and second member including at least four members arranged in one of a spiral; a spline; and a zig-zag shape.

7. The method of claim 1 wherein the step of directing unfiltered liquid from outside of a filter arrangement includes a first end cap adjacent to the first end of the first tubular media pack; and a second end cap adjacent to the second end of the first tubular media pack.

8. The method of claim 7 wherein the step of directing unfiltered liquid from outside of a filter arrangement includes the second tubular media pack having a first end and an opposite second end; and further comprising a third end cap secured to the first end of the second tubular media pack; the third end cap being a closed end cap.

9. The method of claim 8 wherein the step of directing unfiltered liquid from outside of a filter arrangement includes the second end of the second tubular media pack and the second end of the first tubular media pack are secured to the second end cap.

10. The method of claim 8 wherein the step of directing unfiltered liquid from outside of a filter arrangement includes the first end of the first tubular media pack is secured to the first end cap; and the third end cap is axially spaced from the first end cap and located in the first interior volume.

11. The method of claim 1 wherein the step of directing unfiltered liquid from outside of a filter arrangement includes the support core having a third interior volume; and the second tubular media pack being located within the third interior volume.

12. The method of claim 1 wherein the step of directing unfiltered liquid from outside of a filter arrangement includes the first ring being adjacent to the first end of the first tubular media pack; and a second ring adjacent to the second end of the first tubular media pack.

* * * * *